UNITED STATES PATENT OFFICE.

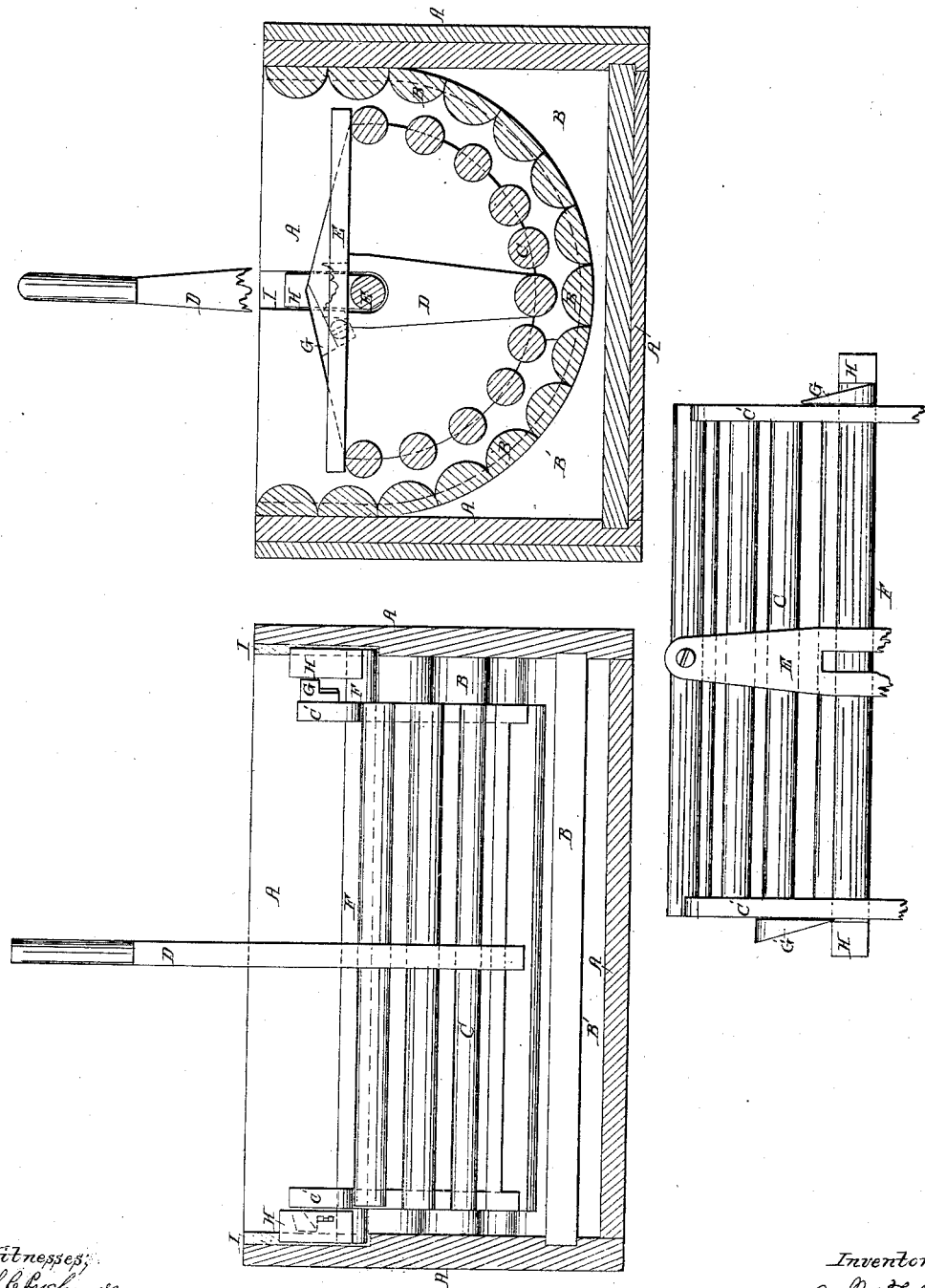

GEORGE W. TOLHURST, OF LIVERPOOL, OHIO.

WASHING-MACHINE.

Specification of Letters Patent No. 23,276, dated March 15, 1859.

*To all whom it may concern:*

Be it known that I, GEO. W. TOLHURST, of Liverpool, county of Medina, and State of Ohio, have invented a new and useful Improvement in Machines for Washing Clothes; and I do hereby declare that the following is a full and exact description thereof, reference being had to the accompanying drawings and to the letters of reference marked thereon.

The nature of my invention consists in a combination of devices hereafter described.

To enable others skilled in the art to make and use my invention I will proceed to describe the construction and operation.

A, A, Figures 1, and 2, is a box.

B, is a second bottom which is formed of slats placed in semicircular grooves cut in the ends of the box A.

B', is a dirt chamber formed between the two bottoms.

C, Figs. 1, 2, and 3, is a semicircular rubber which is formed by screwing slats of any desired form to the outer periphery of two solid heads "marked" C', C'. In or near the center of said rubber is secured a handle marked D, which is connected to the rubber by means of the cross piece E.

F is a small shaft which form bearings for the rubber C, to each end of the rubber is secured a wedge marked G, G, as the rubber is oscillated. The wedges G, come in contact with the side blocks H, H, which cause the rubber to be moved sidewise " or endwise" at the same time it is oscillating. This compound motion keeps the clothes from being drawn into folds. The sideblocks H, are secured to the ends of the shaft F, said side blocks being placed in grooves cut into the ends of the box and marked I, I. This allows the rubber to adjust itself to the inequalities of the clothes.

Having described my improved washing machine, what I claim as new and desire to secure by Letters Patent, is—

The shaft F, blocks H, H, and wedges G, G, or their equivalents, in combination with the oscillating rubber C, slatted bottom B, dirt chamber A' and box A the whole being arranged and operating in the manner and for the purpose as set forth.

GEO. W. TOLHURST.

Witnesses:
S. C. PRICHARD,
G. A. DAUDO.